United States Patent [19]

Lindén

[11] Patent Number: 5,570,510
[45] Date of Patent: Nov. 5, 1996

[54] LOPPER

[75] Inventor: Erkki O. Lindén, Billnäs, Finland

[73] Assignee: Fiskars Oy Ab, Helsinki, Finland

[21] Appl. No.: 484,846

[22] Filed: Jun. 7, 1995

Related U.S. Application Data

[63] Continuation-in-part of Ser. No. 217,916, Mar. 25, 1994, Pat. No. 5,426,857, which is a continuation-in-part of Ser. No. 23,811, Feb. 26, 1993, Pat. No. 5,325,592, which is a continuation-in-part of Ser. No. 986,057, Nov. 30, 1992, Pat. No. 5,341,573.

[51] Int. Cl.$^6$ .................................................... B26B 13/00
[52] U.S. Cl. ............................ 30/250; 30/192; 76/106.5
[58] Field of Search ............................ 30/191, 192, 193, 30/237, 238, 239, 244, 249, 250, 252, 254, 262, 190, 251; 76/106.5

[56] References Cited

U.S. PATENT DOCUMENTS

| | | | |
|---|---|---|---|
| 107,577 | 9/1870 | Will | 30/250 |
| 863,111 | 8/1907 | Smohl | 30/192 |
| 1,689,648 | 10/1928 | Voleske . | |
| 1,814,113 | 7/1931 | Bernard | 30/262 |
| 1,915,404 | 6/1933 | Clifton . | |
| 3,372,478 | 3/1968 | Wallace et al. | 30/193 |
| 4,964,216 | 10/1990 | Gosselin | 30/254 |
| 5,020,222 | 6/1991 | Gosselin et al. | 30/251 |
| 5,179,783 | 1/1993 | Melter | 30/262 |
| 5,325,592 | 7/1994 | Linden et al. | 30/254 |
| 5,341,573 | 8/1994 | Linden et al. | 30/254 |
| 5,426,857 | 6/1995 | Linden | 30/262 |

FOREIGN PATENT DOCUMENTS 565139 10/1944 United Kingdom ..................... 30/237

*Primary Examiner*—Hwei-Siu Payer
*Attorney, Agent, or Firm*—Foley & Lardner

[57] ABSTRACT

A lopper of the type having an anvil cooperable with a blade actuated by a pair of elongated members made of moldable material, the first member being unitary and comprising a first handle merging into a first gear segment having a central post integral therewith, the first member terminating at a distal end by the anvil, the second elongated member comprising a second handle merging into a second gear segment at one end of the member, the second gear segment having a second post integral therewith, the first and second members being pivotally connected to a metal plate at the central and second posts. The moldable material is most preferably a plastic, but other moldable substances could be employed.

20 Claims, 6 Drawing Sheets

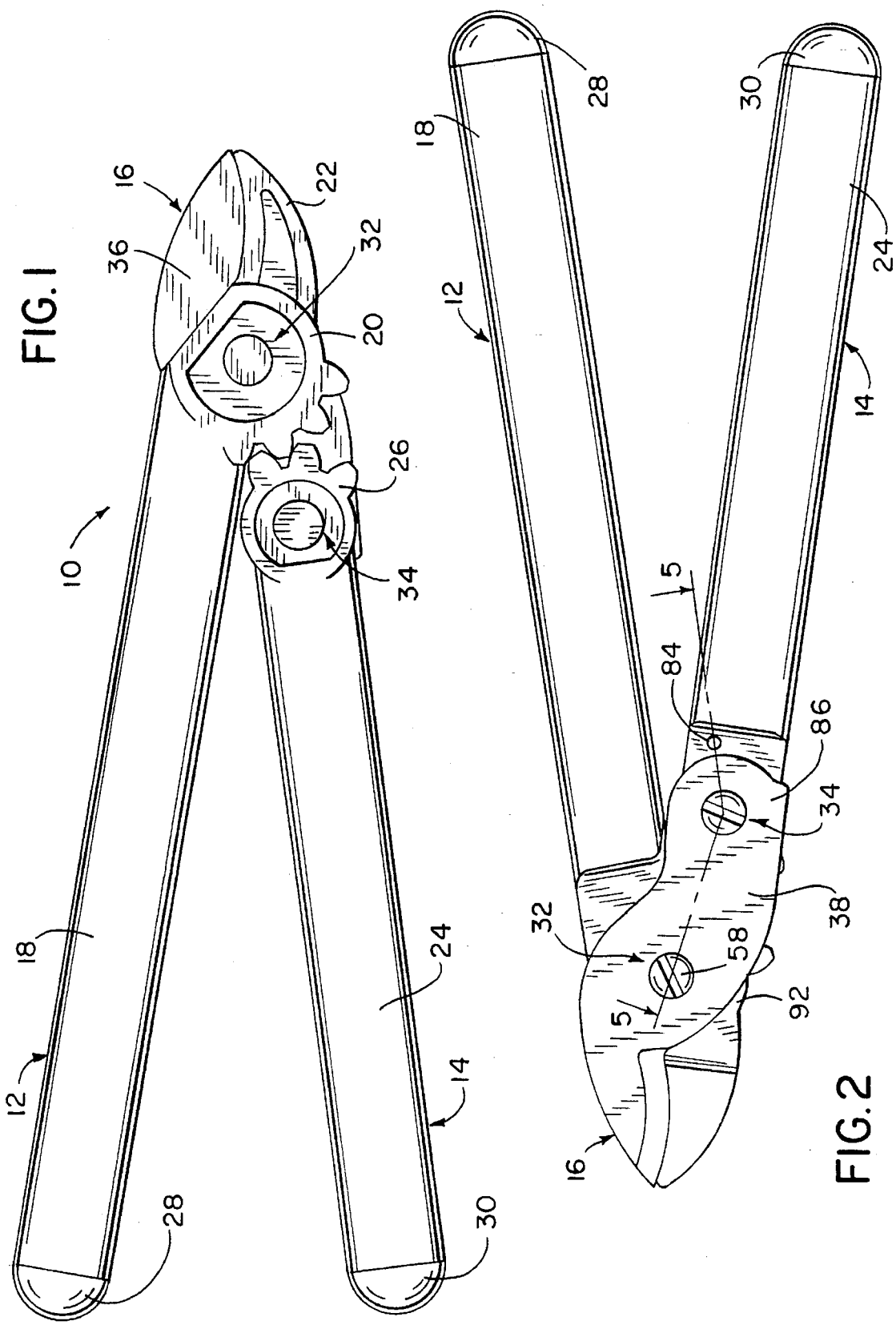

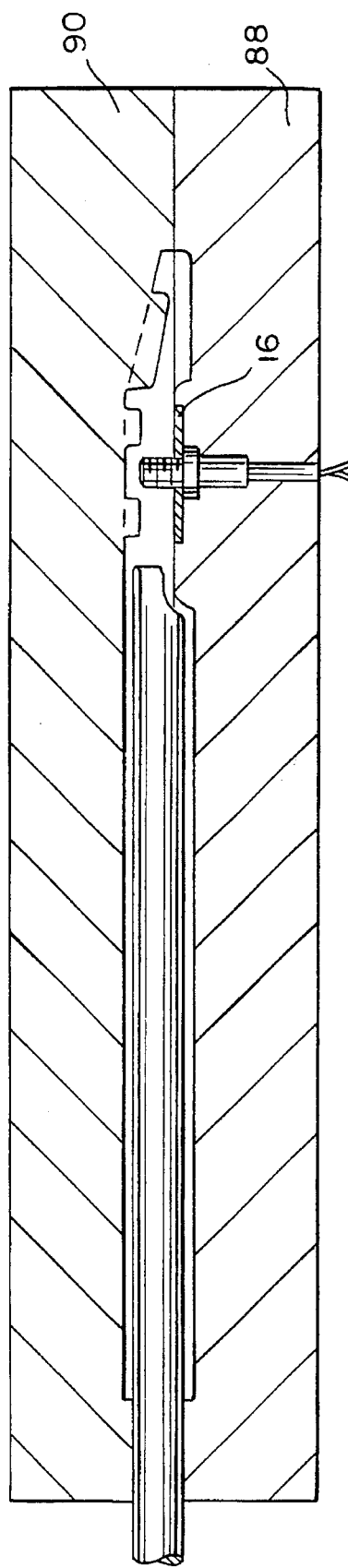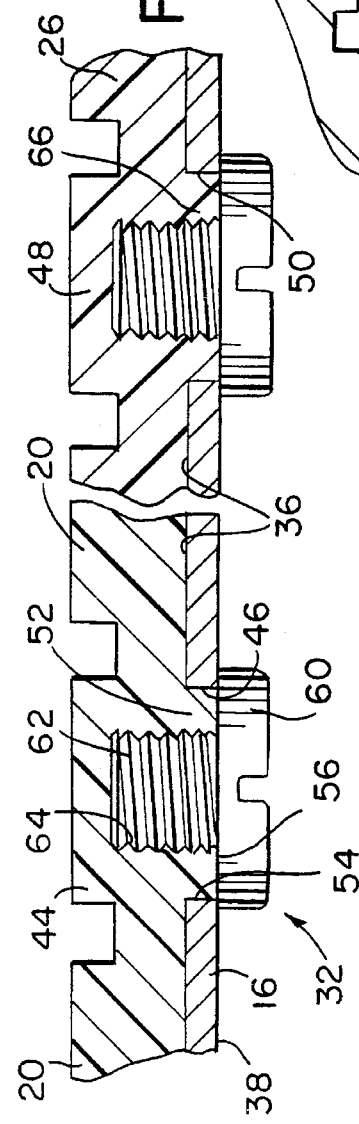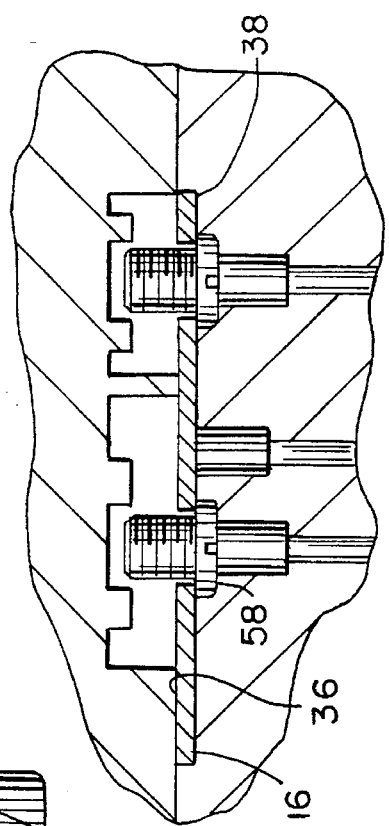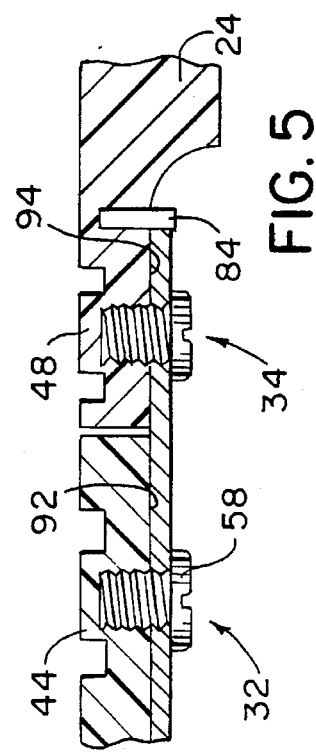

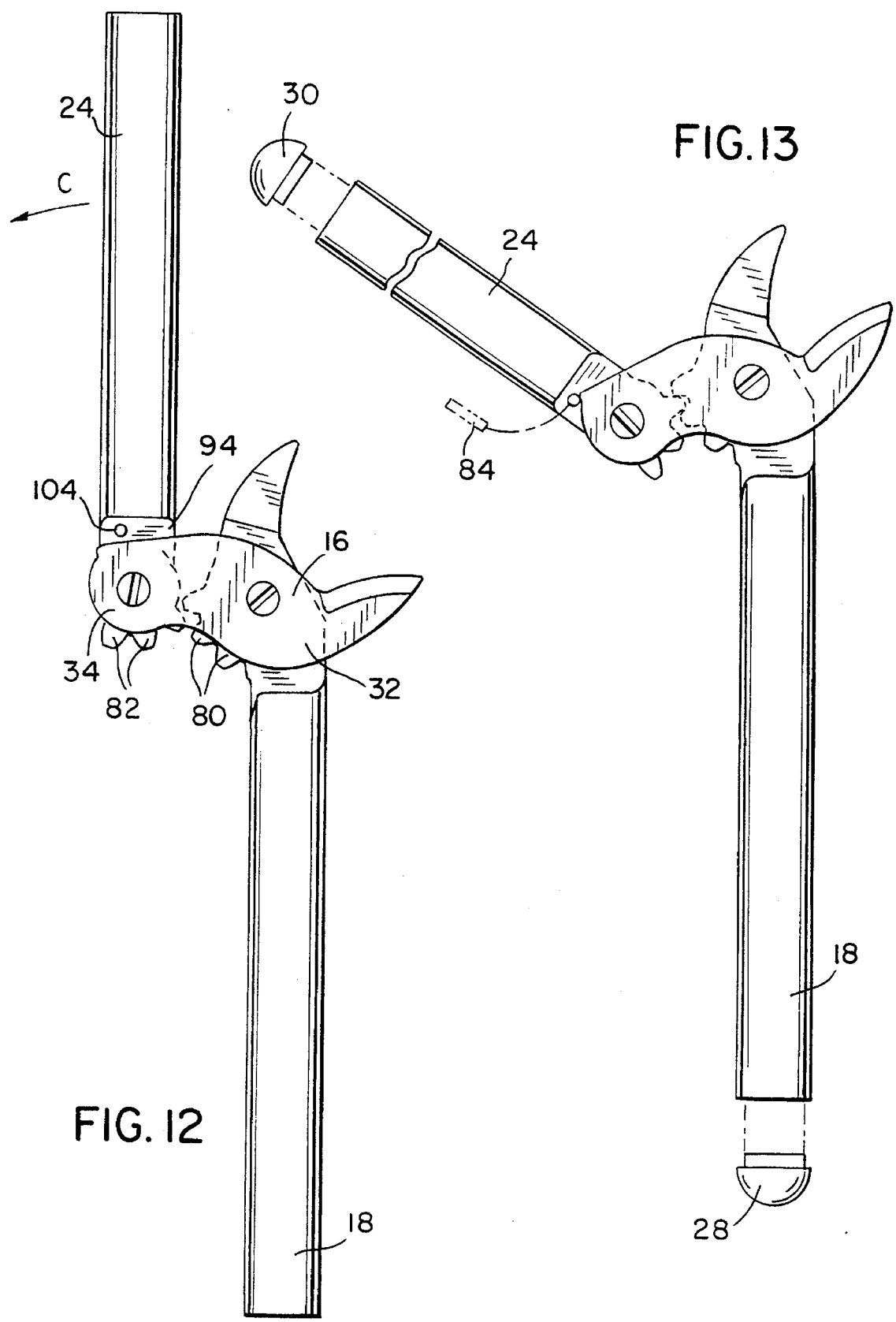

LOPPER

CROSS-REFERENCE TO RELATED APPLICATIONS

This is a continuation-in-part application of U.S. patent application Ser. No. 08/217,916, filed Mar. 25, 1994, now U.S. Pat. No. 5,426,851, which is a continuation-in-part application of U.S. patent application Ser. No. 08/023,811, filed Feb. 26, 1993, now U.S. Pat. No. 5,325,592, which is a continuation-in-part application of U.S. patent application Ser. No. 07/986,057, filed Nov. 30, 1992, now U.S. Pat. No. 5,341,573.

FIELD OF THE INVENTION

The present invention relates generally to shearing devices such as lopping shears.

BACKGROUND OF THE INVENTION

Lopping shears having a pair of elongated members disposed for cooperative engagement about a pivotable joint are widely used. Each of such members generally comprises a jaw, typically made of stamped or forged metal or other suitable material, having an opposed force-applying end or tang connected to a long handle. Such configuration gives the user extra leverage to perform the desired cutting operation, and extended reach to trim distance tree branches and the like. In anvil-type loppers, one of the jaws is formed as a blade while the other jaw is configured as an anvil.

Lopper handles must be sufficiently strong to withstand the forces involved in cutting heavy growth. Although such handles have often been made of wood, to reduce forearm fatigue, more recent prior art loppers have included hollow handles made of fiberglass or other suitable material. In both of these cases, however, lopper handles are attached to the tang of the jaws in a fairly similar manner. Specifically and as shown in U.S. Pat. No. 5,020,222 issued Jun. 4, 1991 to Gosselin et al., after the tang has been inserted into the handle, a fastener such as a rivet or the like is driven into the handle through an end cap and the annealed portion of the tang. In the case of hollow handles, a tubular insert is disposed interiorly of the handle at the end disposed to receive the tang. To increase comfort, a handle grip conforming to the hands of the user and preferably made of moldable material is formed as a separate operation and then fitted onto the end of the handles.

Other examples of prior art loppers are described in U.S. Pat. No. 3,372,478 issued Mar. 12, 1968 to Wallace et al., and in U.S. Pat. No. 4,964,216 issued Oct. 23, 1990 to Gosselin. In all of these instances, assembling the handles as described above is typically preceded by assembling the jaws and pivot.

Shearing heavy growth such as tree limbs on the order of two inches in diameter requires considerable force. To provide additional leverage, lopping shears are often provided with extra long handles. However, such loppers tend to be overly heavy, awkward to manipulate, and costly. These constraints have already been recognized and addressed by those skilled in the art. U.S. Pat. No. 5,020,222 to Gosselin discloses a compound action lopper in which an additional lever member connected to one of the jaws increases the cutting force transmitted to the jaws, thereby facilitating the cutting operation. Such structure provides the additional leverage desired, without unduly augmenting the length of the handles. Other ways to transmit a significant amount of force to the jaws of a pivoted tool, although to the inventor's knowledge not conventionally used with loppers, are well known. Examples of such other tools capable of applying a significant cutting force to the jaws are described in U.S. Pat. No. 1,689,648 issued Oct. 30, 1928 to Voleske and U.S. Pat. No. 1,915,404 issued Jun. 27, 1933 to Clifton. In both of these cases, the pivoting movement of a handle is transmitted to the jaws of the shears by a pair of intermeshing gear segments.

While loppers of the type described in the foregoing suitably perform the desired cutting function, it can be readily appreciated that these prior art structures have several shortcomings. First, prior art loppers configured for increased leverage typically include various components which require in some cases several manufacturing steps, followed by the assembly of these components, thereby potentially increasing the weight of these devices and their cost. In addition, in normal use loppers are typically guided by the user through areas heavily congested by branches of trees or plants to reach a limb to be trimmed. Accordingly, these many components increase the tendency of the loppers to become caught in these branches.

In light of the foregoing, it appears desirable to provide a lopper which can alleviate the problems associated with conventional items of that kind, i.e., which includes fewer components to reduce its cost and weight and facilitate its assembly, which is compact in configuration while providing increased leverage, and which is less susceptible to being caught in congested foliage areas.

It can also be recognized that prior art methods used to manufacture loppers have certain obvious disadvantages. These methods typically require manufacturing various components such as jaws, levers, handles, grips, end caps, or inserts, and subsequently assembling these components preferably into subassemblies, thereby increasing material handling requirements which generally translates into higher unit cost.

Thus, the foregoing indicates that, not only is it desirable to provide loppers with fewer components less prone to being caught in heavy foliage areas, it is also desirable to provide loppers which are engineered to lend themselves to functional assembly during, as opposed to subsequent to, the manufacturing process, or which otherwise reduce the number of operations required to manufacture these tools, while having all necessary features typically desired by users of these tools.

SUMMARY OF THE INVENTION

The present invention facilitates the manufacturing of loppers configured to provide increased leverage by simplifying the manufacturing process and eliminating secondary assembly operations typically required with such tools, and by improving, or at least maintaining, the functional quality of these tools. A method for making loppers in accordance with the invention is characterized in that a metal plate including a jaw is disposed in a cavity of a mold section to which an uncured or otherwise flowable polymer, copolymer or the like is supplied, as by injection, to form a unitary first member pivotally connected to the plate, and having a handle, a midportion configured as a gear segment and terminating by an anvil. The flowable material is also supplied to a second cavity of the mold to form the second elongated member comprising a handle merging into a second gear segment. The second member is pivotally connected to the plate at a second pivot point offset from the first pivot point, so that the first and second gear segments are intermeshing. Accordingly, tools in accordance with the invention can be constructed without requiring post manufacturing assembling operations, other than positioning a pin to limit the opening of the handles.

Loppers according to one aspect of the invention include a metal plate having oppositely facing inner and outer surfaces and a central aperture, a forwardly extending blade, and a rearwardly extending tang provided with a second aperture at a position offset from the central aperture. The first elongated member, which is formed as a unitary piece, is pivotally connected to the plate about the central aperture, and is molded onto the inner surface of the plate. The first member comprises a first handle merging into a first gear segment and terminating at a distal end by an anvil configured for engagement with the blade. According to the invention, the lopper also includes a second elongated member pivotally connected to the plate about a second aperture offset from the central aperture, and is also molded onto the inner surface of the plate. The second member comprises a second handle merging into a second gear segment at one end of the member. The relative position of the central and second apertures is such that the gear segments intermesh for scissor-like movement of the blade and anvil in response to pivotal movement of the handles.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and:

FIG. 1 is a top plan view of a lopper in accordance with one aspect of the invention, the lopper being shown in closed position;

FIG. 2 is a bottom plan view of the lopper of FIG. 1;

FIG. 5 is a partial sectional view taken along line 5—5 shown in FIG. 2;

FIG. 5a is an enlarged partial sectional view of the pivot points shown in FIG. 5;

FIG. 8 is a front elevational view of the mold for the manufacture of a lopper shown in FIG. 1, showing a core positioned in a cavity of the mold configured to form one of the handles;

FIG. 9 is a partial sectional view taken along line 9—9 shown in FIG. 6;

FIG. 12 is a bottom plan view of the lopper shown in FIG. 1, corresponding to the second step of the post-molding assembly shown in FIG. 11; and FIG. 13 is a top plan view of the lopper of FIG. 1, showing the final step of the post-molding assembly, with the gear segments intermeshing.

DETAILED DESCRIPTION OF A PREFERRED EXEMPLARY EMBODIMENT

Figure 3:
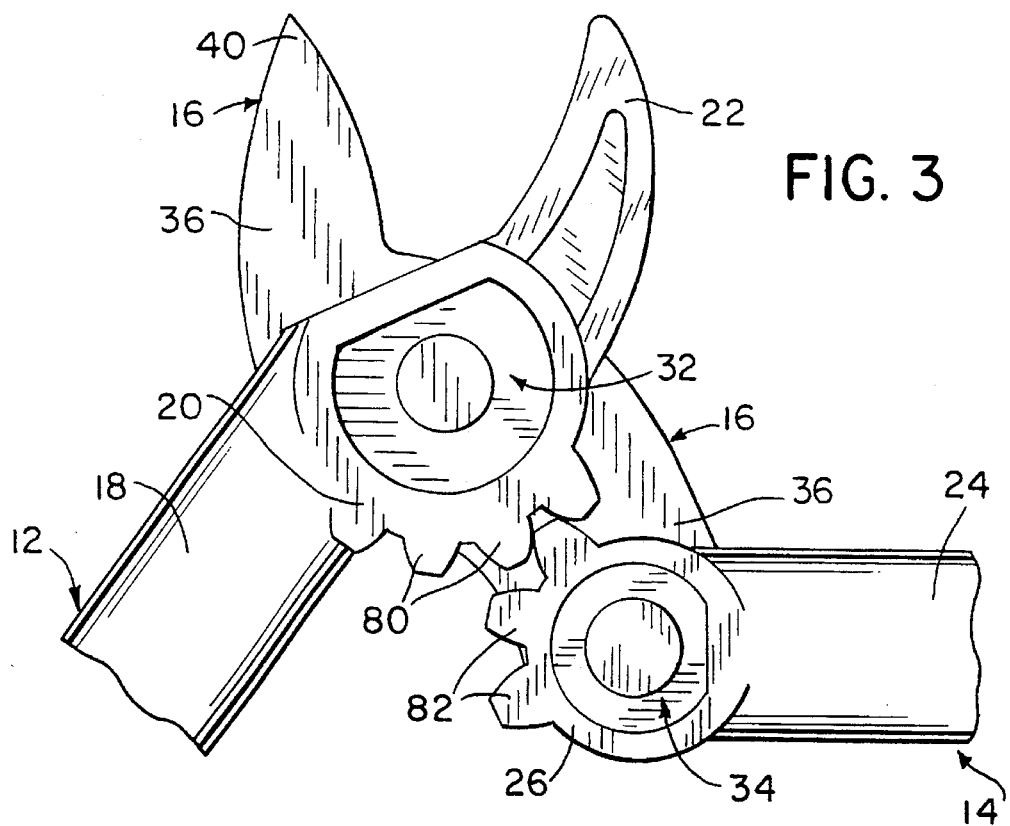
FIG. 3 is a partial top plan view of the pivot points of the lopper of FIG. 1.
Figure 4:
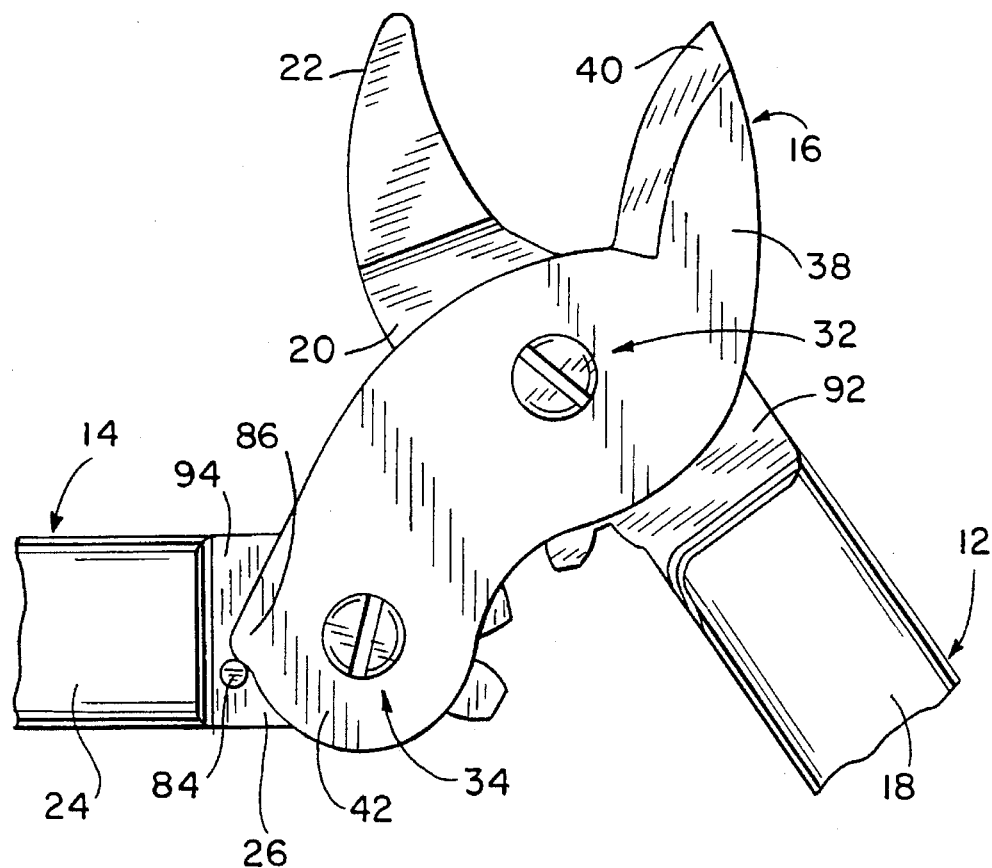
FIG. 4 is a partial bottom plan view of the pivot points shown in FIG. 3.

Referring to FIGS. 1 and 2, a lopper 10 according to the invention includes first and second elongated members 12 and 14, respectively, and a metal plate 16. First member 12 is formed as a unitary piece and comprises a first handle 18 merging into a first gear segment 20 and terminating at a distal end by a jaw 22. Second elongated member 14 includes a handle 24 merging into a second gear segment 26. For added comfort to the user, since as will be explained below the handles of lopper 10 are preferably hollow, handles 18 and 24 are also provided with end caps 28, 30, respectively.

Referring now to FIGS. 1–5, first member 12 is pivotally connected to plate 16 at a central pivot point 32. Similarly, second member 14 is pivotally connected to plate 16 at a second pivot point 34. Plate 16 is conveniently made out of steel and has spaced apart and oppositely facing inner and outer surfaces 36, 38. Plate 16 comprises a forwardly extending jaw in the form of a cutting blade 40, an opposed force-applying end or tang 42, and a central aperture 46 formed in plate 16 intermediate jaw 40 and tang 42. Plate 16 also includes a second aperture 50 formed therein at a position offset from central aperture 46.

Referring more particularly to FIGS. 3, 4, 5, and 5a, central pivot point 32 is formed of pivot region 44 of gear segment 20 cooperating with central aperture 46. In particular, central pivot region 44 comprises a plastic pivot post 52 integrally formed with gear segment 20 which is unitary with handle 18 and anvil 22. Post 52, which is formed in situ, i.e., within the mold cavity receiving plate 16, extends effectively from inner surface 36 of plate 16 through aperture 46 into close conforming engagement with an interior surface 54 of aperture 46. The distal end 56 of post 52 is preferably approximately flush with outer surface 38. Pivot point 32 further comprises a fastener such as a screw 58 having an enlarged diameter head 60 and a threaded stem 62 secured in a central threaded hole 64 in post 52. Because post 52 extends only to the juncture of outer surface 38 and aperture 46, head 60 lies adjacent to and is effectively in contact with both outer surface 38 and end 56 of post 52. Screw 58, which pivotally secures elongated member 12 to plate 16, can be tightened or loosened to control the compressive force applied to elongated member 12 at pivot point 32. In forming pivot 32, screw 58 may be inserted into the mold cavity in its desired position together with plate 16, so that plastic fills in around it to form threaded hole 64.

Similarly, second pivot point 34 is formed of second pivot region 48 cooperating with second aperture 50. Since pivot region 48 is preferably substantially identical in structure to central pivot region 44, i.e., it includes a post formed in situ within the mold cavity receiving plate 16, a detailed description of pivot point 34 will not be repeated here. Instead, the description of the components and structures associated with pivot point 32 as given in the immediately preceding paragraph equally applies to pivot point 34.

Turning now more particularly to a description of the gear segments and referring to FIGS. 1–5 and 9, each elongated member of lopper 10 is provided with a gear segment 20, 26 formed integrally with a respective handle 18, 24. Each of these gear segments is arcuate and comprises a plurality of outwardly extending intermeshing teeth 80, 82. Teeth 80 are formed in suitably configured cavities of the mold, these cavities being in fluid communication with handle 18 so that teeth 80 are integrally formed with handle 18. Similarly, teeth 82 are formed integrally with handle 24. Those skilled in the art will also recognize that teeth 80, 82 may take other forms, so long as they are cooperable to produce scissor-action of anvil 22 with respect to blade 40 in response to pivotal movement of handles 18, 24. To limit the opening of handles 18, 24, handle 24 is provided with a stop or pin 84 cooperating with an outwardly extending region 86 formed in tang 42 of plate 16.

Figure 6:
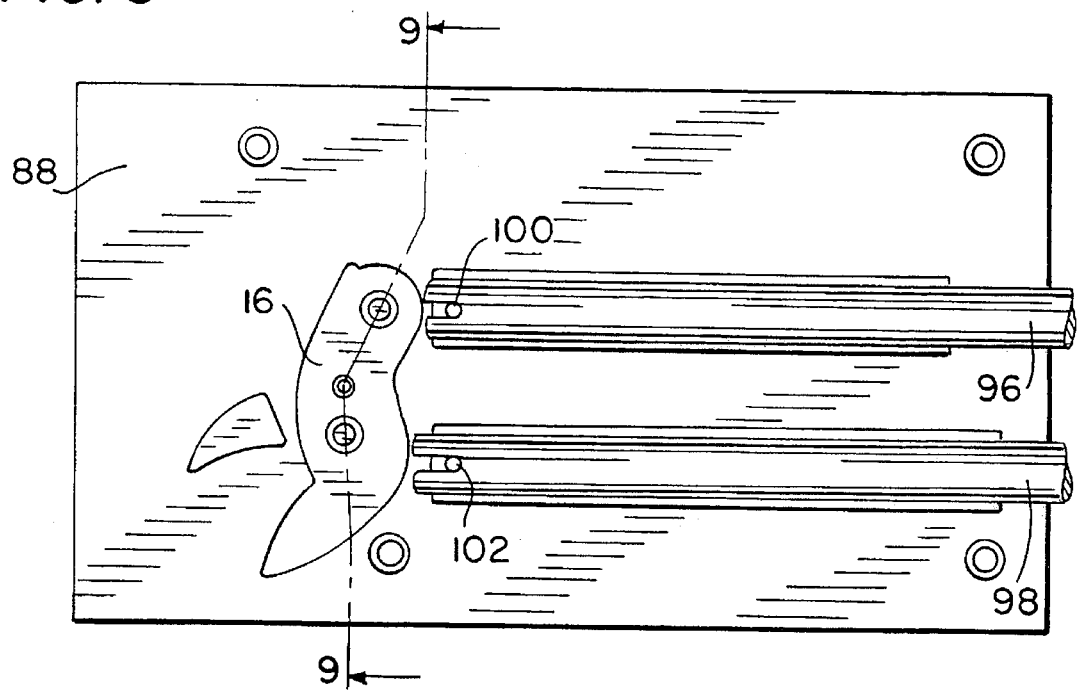
FIG. 6 is a top plan view of one section of a mold for the manufacture of a lopper shown in FIG. 1.
Figure 7:
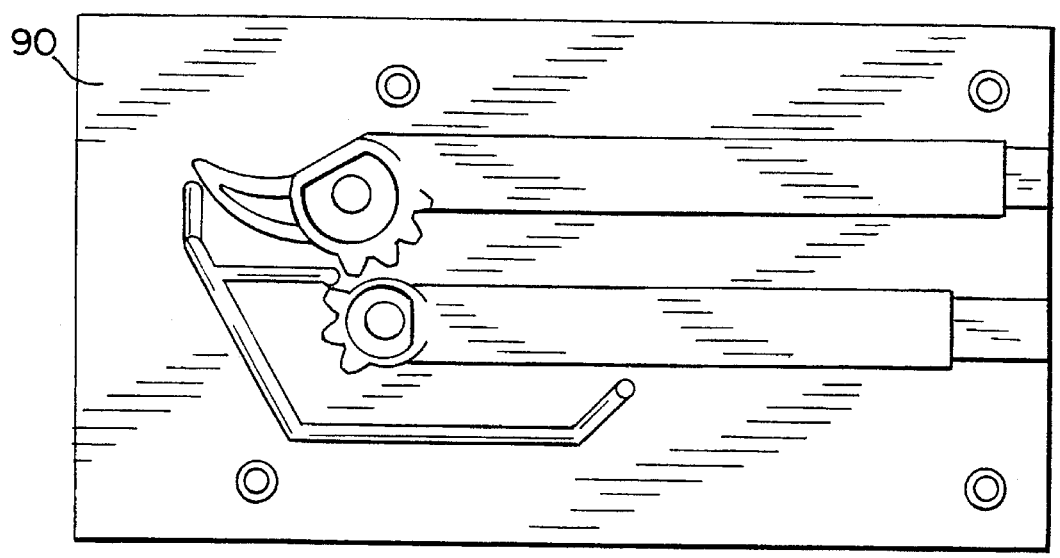
FIG. 7 is a top plan view of the other section of the mold for the manufacture of a lopper shown in FIG. 1.

Referring to FIGS. 1, 2, 5a, and 6–13, lopper 10, is formed in one molding operation in a mold comprising two sections, each section being generally designated as 88, 90. Referring more particularly to FIGS. 6 and 7, lopper 10 is formed in situ, i.e., within the mold cavity receiving plate 16. To that end, the cavities of mold sections 88, 90 configured to form members 12 and 14 are in fluid communication, as shown in FIG. 7. Since members 12 and 14 are formed onto inner surface 36 of plate 16, inner surfaces 92, 94, of respective gear segments 20, 26 are effectively in contact with inner surface 36. As a result, posts 52, 66 which are formed integrally with gear segments 20, 26, respectively, extend from the inner surface 36 through apertures 46, 50, to a point which is substantially flush with outer surface 38.

A preferred embodiment of lopper 10 is provided with hollow handles. This reduces the weight of tool 10 but also significantly cuts down the cooling time required before ejection of tool 10 from the mold, thereby decreasing the cost to manufacture that item. To that end, a pair of removable cores 96, 98 are inserted into mold sections 88, 90 in abutting relationship with guiding pins 100, 102, so as to form hollow handles 18 and 24 having interior cavities of predetermined size. Once the molding operation is completed and before ejecting lopper 10 from the mold, cores 96, 98 are retracted.

Figures 10, 11:
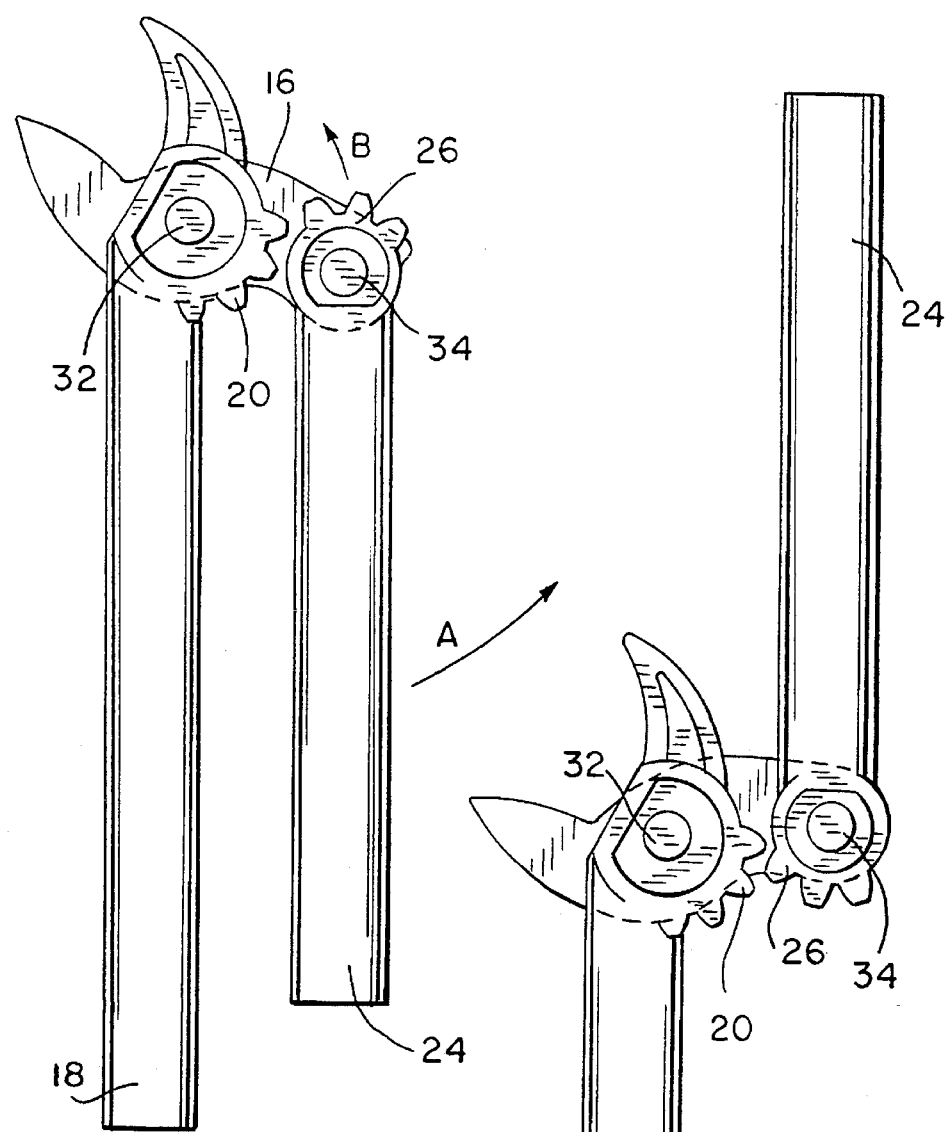
FIG. 10 is a top plan view of the lopper of FIG. 1, showing the first step of the post-molding assembly.
FIG. 11 is a top plan view of the lopper of FIG. 1, showing the second step of the post-molding assembly.

Referring to FIGS. 10–13, to complete the assembly of lopper 10 once it has been ejected from the mold, handle 24 is rotated about pivot point 34 away from handle 18 in the direction of arrow A (shown in FIG. 10), while plate 16 is rotated in the direction of arrow B (also shown in FIG. 10) about pivot point 32. This permits gear segment 26 to become oppositely facing with gear segment 20, as shown in FIG. 11. At that time, handle 24 is rotated toward handle 18 in the direction of arrow C (as shown in FIG. 12), so that teeth 80 and 82 become intermeshing. Finally, since it is well known that limiting the opening of the handles of a lopping tool will facilitate its use, once handles 18, 24 are substantially parallel, pin 84 is installed in a suitably configured bore 104 formed in inner surface 94 of gear segment 26, as shown in FIG. 13.

Loppers according to the invention can be manufactured with improved facility, eliminating secondary assembling operations typically required with prior art items of this sort. The manufacturing cost of tools in accordance with the invention is noticeably reduced, and consistency of the appearance and the functional characteristics of these tools can be improved.

It is understood that the above description is of a preferred exemplary embodiment of the invention, and that the invention is not limited to the specific forms described. For example, tools in accordance with the invention having geared handles and unitary pivots could comprise a pair of opposed cutting blades, as in by-pass pruners, instead of a blade cooperating with an anvil as described in the preferred embodiment. In such a case, the first gear segment would be molded onto the tang of the second blade. Moreover, even though the preferred embodiment of the invention shows intermeshing teeth having a particular configuration, those skilled in the art will appreciate that the intermeshing function could be provided in other ways without departing from the scope of this invention. Such other constructions are considered to be within the scope of this invention. These and other substitutions, modifications, changes and omissions may be made in the design and arrangement of the elements and in the manufacturing steps disclosed herein without departing from the scope of the appended claims.

I claim:

1. A lopper, comprising:

a metal plate having oppositely facing inner and outer surfaces and a central aperture, a forwardly extending blade and a rearwardly extending tang having a second aperture offset from the central aperture;

a first elongated member formed as a unitary piece and comprising a first handle merging into a first gear segment and terminating at a distal end by an anvil configured for engagement with the blade; and a second elongated member comprising a second handle merging into a second gear segment at one end thereof;

the first and second members being pivotally connected to the plate at the central and second apertures, respectively, so that the gear segments intermesh for pivotal movement of the blade and anvil in response to pivotal movement of the first and second handles about the central and second apertures, respectively.

2. The lopper of claim 1, wherein the first and second members are made of a moldable material molded onto the inner surface of the plate.

3. The lopper of claim 2, wherein each of the members respectively comprises a round post integral therewith and extending in a respective one of the apertures to form a pivot point, each post being in close conforming engagement with an interior surface of the respective one of the apertures.

4. The lopper of claim 3, wherein each of the posts cooperate with a headed fastener to unite the members to the plate.

5. The lopper of claim 4, wherein each of the posts has an axial opening therein, and the fastener is secured in the axial opening in engagement with the metal plate to secure the first and second elongated members to the plate.

6. The lopper of claim 5, wherein the fastener comprises a screw, and the axial opening is threaded for receiving the screw therein in a manner effective to control compressive force applied to the elongated members at the pivot between the member and the plate.

7. The lopper of claim 3, wherein each of the posts extends from the inner surface of the plate to a point lying substantially proximate but below the outer surface thereof.

8. The lopper of claim 2, wherein the first and second handles are hollow.

9. The lopper of claim 1, wherein each of the gear segments is arcuate and comprises a plurality of teeth extending outwardly therefrom.

10. The lopper of claim 1, wherein the plate further comprises an outwardly extending region formed in a region of the tang, and the second handle further includes a stop extending from the second segment toward the plate by a predetermined distance, the stop and region being configured to cooperate to limit opening of the handles.

11. The lopper of claim 10, wherein the stop is a pin, a portion of which is received in a bore formed in a surface of the second segment facing the inner surface of the plate.

12. A lopper having a pair of elongated members made of a moldable material, the lopper comprising:
- a metal plate having oppositely facing inner and outer surfaces and a central aperture, a forwardly extending blade, and a rearwardly extending tang provided with a second aperture formed therein at a position offset from the central aperture;
- a first elongated unitary member pivotally connected to the plate and molded onto the inner surface thereof, the first member comprising a first handle merging into a first gear segment and terminating at a distal end by an anvil configured for engagement with the blade; and
- a second elongated member pivotally connected to the plate and molded onto the inner surface thereof, the second member comprising a second handle merging into a second gear segment at one end of the member;
- the relative position of the central and second apertures being such that the gear segments intermesh for pivotal movement of the blade and anvil in response to pivotal movement of the handles.

13. The lopper of claim 12, wherein each of the members is pivotally connected to the plate by a round post formed integrally with a respective one of the gear segments and extending from the inner surface of the plate through a respective one of the apertures, into close conforming engagement with an interior surface of the aperture, to a point lying adjacent but below the outer surface of the plate.

14. The lopper of claim 13, wherein each of the posts cooperates with a headed fastener to unite the members to the plate.

15. The lopper of claim 12, wherein the first and second handles are hollow.

16. The lopper of claim 12, wherein each of the gear segments is arcuate and comprises a plurality of teeth.

17. The lopper of claim 12, wherein the plate further comprises an outwardly extending region formed in a region of the tang, and the second handle further includes a stop extending from the second segment toward the plate by a predetermined distance, the stop and region being configured to cooperate to limit opening of the handles.

18. A method for making a lopper of the type having an anvil cooperable with a blade actuated by a pair of elongated members made of moldable material, the first member being unitary and comprising a first handle merging into a first gear segment having a central post integral therewith, the first member terminating at a distal end by the anvil, the second elongated member comprising a second handle merging into a second gear segment at one end of the second member, the second gear segment having a second post integral therewith, the first and second members being pivotally connected to a metal plate about the posts, the method comprising the steps of:
- positioning into a mold the metal plate having the blade extending forwardly and a rearwardly extending tang, the metal plate having a central aperture and a second aperture offset from the central aperture, each of the apertures having a headed fastener inserted therethrough; and
- molding the first and second elongated members onto the metal plate using a moldable plastic such that the central post is formed by filling in the central aperture, and the second post is formed by filling in the second aperture.

19. The method of claim 18, wherein the molding step also comprises, prior to molding the members, positioning two removable cores into cavities of the mold configured to form the handles so that the members are provided with hollow handles.

20. The method of claim 18, wherein the lopper also includes a stop configured as a pin and the plate further includes an outwardly extending region cooperating with the pin to limit the opening of the handles, the method further comprising the step of inserting the pin into a bore formed into the second member once the gear segments are intermeshing.

* * * * *